United States Patent
Völkel et al.

(10) Patent No.: US 7,046,423 B2
(45) Date of Patent: May 16, 2006

(54) SEPARATION OF ENCAPSULATED PARTICLES FROM EMPTY SHELLS

(75) Inventors: Armin R. Völkel, Mountain View, CA (US); Peter M. Kazmaier, Mississauga (CA); Naveen Chopra, Oakville (CA); Jürgen Daniel, Mountain View, CA (US)

(73) Assignee: Xerox Corporation, Stamford, CT (US)

( * ) Notice: Subject to any disclaimer, the term of this patent is extended or adjusted under 35 U.S.C. 154(b) by 683 days.

(21) Appl. No.: 10/345,434

(22) Filed: Jan. 15, 2003

(65) Prior Publication Data

US 2004/0135743 A1 Jul. 15, 2004

(51) Int. Cl.
*G02B 26/00* (2006.01)
*B01J 13/02* (2006.01)
*B32B 9/00* (2006.01)
*G09G 3/34* (2006.01)

(52) U.S. Cl. ............ 359/296; 264/4.3; 428/402.21; 345/107

(58) Field of Classification Search ............ 264/4, 264/4.1, 4.3; 345/107; 359/296; 428/402.2, 428/402.21, 402.24
See application file for complete search history.

(56) References Cited

U.S. PATENT DOCUMENTS

| | | | |
|---|---|---|---|
| 3,384,488 A | 5/1968 | Tulagin et al. | 430/32 |
| 3,384,565 A | 5/1968 | Tulagin et al. | 430/32 |
| 3,384,566 A | 5/1968 | Clark | 430/32 |
| 4,009,466 A | 2/1977 | Clark | 382/165 |
| 4,032,339 A | 6/1977 | Grushkin et al. | 430/1 |
| 4,076,527 A | 2/1978 | Nealy | 430/37 |
| 4,126,854 A | 11/1978 | Sheridon | 345/107 |
| 4,143,103 A | 3/1979 | Sheridon | 264/4 |
| 5,075,186 A | 12/1991 | Sheridon | 430/47 |
| 5,262,098 A | 11/1993 | Crowley et al. | 264/8 |
| 5,344,594 A | 9/1994 | Sheridon | 264/4.1 |
| 5,389,945 A | 2/1995 | Sheridon | 345/85 |
| 5,604,027 A | 2/1997 | Sheridon | 428/323 |
| 5,708,525 A | 1/1998 | Sheridon | 359/296 |
| 5,827,707 A * | 10/1998 | Lamberti | 435/178 |
| 6,067,185 A | 5/2000 | Albert et al. | 359/296 |
| 6,465,226 B1 * | 10/2002 | Zimmermann | 435/177 |
| 2003/0219384 A1 * | 11/2003 | Donath et al. | 424/9.6 |
| 2006/0006560 A1 * | 1/2006 | Enright et al. | 264/4.1 |

OTHER PUBLICATIONS

E INK Web Pages "Technology" and "Active Matrix Displays" (printed Dec. 16, 2002).

"E INK, Toppan and Philips Demonstrate World's First High Resolution, Active-Matix Color, Display with Electronic Ink," Press Release (Jul. 1, 2002).

* cited by examiner

*Primary Examiner*—David N. Spector
(74) *Attorney, Agent, or Firm*—Nixon Peabody LLP

(57) ABSTRACT

Methods and systems for separating encapsulated particles from empty shells. One method involves providing a mixture including at least one dipolar particle encapsulated in a shell and at least one shell which does not encapsulate a dipolar particle. The mixture is positioned in a spatially inhomogeneous electric or magnetic field and at least one encapsulated dipolar particle is isolated from the mixture.

24 Claims, 6 Drawing Sheets

SEPARATION OF ENCAPSULATED PARTICLES FROM EMPTY SHELLS

FIELD OF THE INVENTION

The present invention relates to the separation of particles encapsulated in a shell from unfilled shells.

BACKGROUND OF THE INVENTION

Bichromal balls have two hemispheres, typically one black and one white, each having different electrical properties. Such bichromal balls are frequently used in a "twisting ball" medium for displaying an image. The twisting ball medium includes internal bichromal balls that rotate to show either black or white hemispheres in response to an externally applied electrical field which are contained in individual liquid filled spherical cavities in a transparent binder, such as a gel. The gel is then bonded between glass or plastic sheets for protection.

Alternatively, such bichromal balls may be enclosed within individual spherical shells and then a space between the ball and shell is filled with a liquid to form a microsphere so that the ball is free to rotate in response to an electrical field. The microspheres can then be mixed into a substrate which can be formed into sheets or can be applied to any kind of surface. The result is a film which can form an image from an applied electrical field. The display formed using this technique allows the formation of a thin, paper-like sheet without the bulkiness and optical problems created by the need for protective cover sheets in a twisting ball medium. In digital document media, the bichromal balls are embedded in a gel matrix. By applying an external electric field, the bichromal balls are rotated to direct either of their two differently colored sides to an observer.

However, with the current processes for encapsulation, a number of empty shells (i.e., shells which do not encapsulate a bichromal ball) are generated with the individual encapsulated bichromal balls. Because both the empty and filled shells have about the same mass, they can not easily be separated by typical sedimentation processes. However, since only filled shells produce an image, the inclusion of empty shells in a medium reduces the image quality. Therefore, for applications requiring high image quality, empty shells will need to be separated from a mixture containing empty shells and filled shells.

SUMMARY OF THE INVENTION

The present invention relates to a method of separating encapsulated dipolar particles from empty shells. This method involves providing a mixture including at least one dipolar particle encapsulated in a shell and at least one shell which does not encapsulate a dipolar particle. The mixture is positioned in a spatially inhomogeneous electric or magnetic field and at least one encapsulated dipolar particle is isolated from the mixture. The dipolar particles include particles having a permanent dipole moment and particles having an induced dipole moment. The dipolar particles also include particles having an electric dipole moment and particles having a magnetic dipole moment.

Another aspect of the present invention relates to a system for separating encapsulated dipolar particles from empty shells. The system includes a mixture including at least one dipolar particle encapsulated in a shell and at least one shell which does not encapsulate a dipolar particle and an apparatus which provides a spatially inhomogeneous electric or magnetic field, wherein the spatially inhomogeneous electric or magnetic field is directed in a non-parallel direction to a direction of motion of the mixture to isolate at least one encapsulated dipolar particle from the mixture.

The present invention also relates to a method of separating encapsulated particles from empty shells. This method involves providing a mixture comprising at least one particle having an electric charge encapsulated in an electrically neutral shell and at least one electrically neutral shell which does not encapsulate a particle. The mixture is positioned in an electric field and at least one encapsulated particle is isolated from the mixture.

Yet another aspect of the present invention relates to a system for separating encapsulated particles from empty shells. The system includes a mixture including at least one particle having an electric charge encapsulated in an electrically neutral shell and at least one electrically neutral shell which does not encapsulate a particle and an apparatus which provides an electric field, wherein the electric field is directed in a non-parallel direction to a direction of motion of the mixture to isolate at least one encapsulated particle from the mixture.

The methods and systems of the present invention allow for the separation of encapsulated particles, e.g., bichromal balls, from unfilled shells. In particular, with the methods of the present invention, at least 20% of the unfilled shells may be separated from a mixture of encapsulated bichromal balls and unfilled shells. This allows for the production of high image quality displays.

DETAILED DESCRIPTION OF THE INVENTION

The present invention relates to a method of separating encapsulated dipolar particles from empty shells. This method involves providing a mixture including at least one dipolar particle encapsulated in a shell and at least one shell which does not encapsulate a dipolar particle. The mixture is positioned in a spatially inhomogeneous electric or magnetic field and at least one encapsulated dipolar particle is isolated from the mixture. As used herein, a mixture describes a combination of two or more components in varying proportions that retain their own properties.

Another aspect of the present invention relates to a system for separating encapsulated dipolar particles from empty shells. The system includes a mixture including at least one dipolar particle encapsulated in a shell and at least one shell which does not encapsulate a dipolar particle and an apparatus which provides a spatially inhomogeneous electric or magnetic field, wherein the spatially inhomogeneous electric or magnetic field is directed in a non-parallel direction to a direction of motion of the mixture to isolate at least one encapsulated dipolar particle from the mixture.

The present invention also relates to a method of separating encapsulated particles from empty shells. This method involves providing a mixture comprising at least one particle having an electric charge encapsulated in an electrically neutral shell and at least one electrically neutral shell which does not encapsulate a particle. The mixture is positioned in an electric field and at least one encapsulated particle is isolated from the mixture.

Yet another aspect of the present invention relates to a system for separating encapsulated particles from empty shells. The system includes a mixture including at least one particle having an electric charge encapsulated in an electrically neutral shell and at least one electrically neutral shell which does not encapsulate a particle and an apparatus which provides an electric field, wherein the electric field is directed in a non-parallel direction to a direction of motion of the mixture to isolate at least one encapsulated particle from the mixture.

Figure 1:
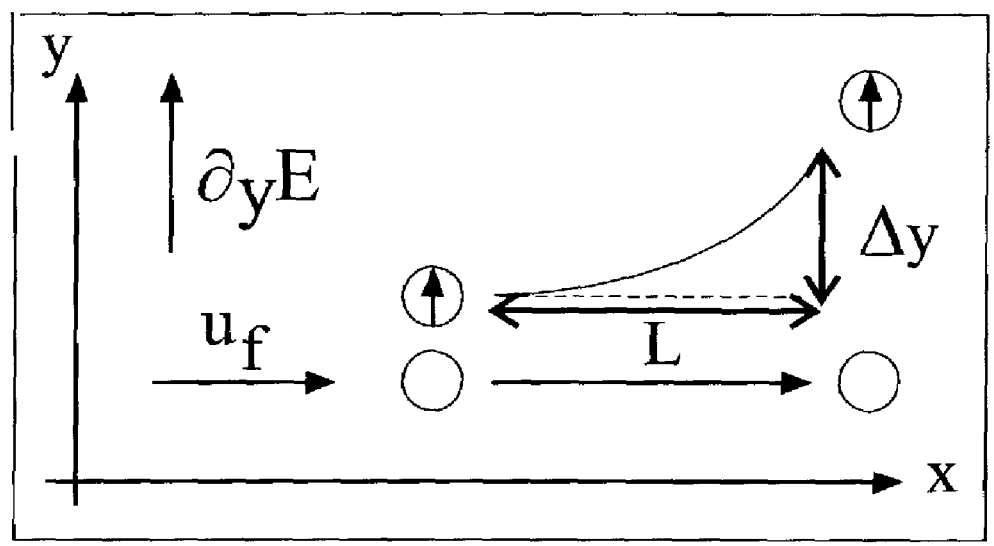
FIG. 1 is a schematic diagram of the flow directions and force directions for the separation of encapsulated bichromal balls by fluid flow.

Referring to FIG. 1, a method and system in accordance with one embodiment of the present invention is shown. In particular, separation of a plurality of encapsulated bichromal balls in laminar fluid flow is shown in FIG. 1. As shown in FIG. 1, all capsules (i.e., a plurality of filled shells and a plurality of empty shells) are provided in a fluid carrier. As used herein, the empty shells do not encapsulate a bichromal ball, but may encapsulate other materials (e.g., the "empty shells" typically encapsulate liquid used to produce a microsphere). Suitable fluid carriers include, but are not limited to, water, Isopar oil, silicon oil, isopropyl alcohol, hexanes, toluene, and mixtures thereof. In one embodiment, the fluid carrier is a non-conductive fluid having a low dielectric constant. The fluid carrier may be either liquid or gas.

The mixture of capsules in the fluid carrier is transported through a spatially inhomogeneous electric field (SIEF). As shown in FIG. 1, the fluid, and with it all of the capsules, moves with the speed $u_f$ in the x direction. The electric field gradient ($\partial_y E$) is parallel to the y direction. Thus, in this embodiment, the electric field is directed substantially perpendicular to the direction of motion of the fluid and capsules. However, the electric field may be directed in any non-parallel direction to the direction of motion of the fluid and capsules, although the separation distance $\Delta y$ between filled and empty capsules increases faster for a given time interval $\Delta t$, when the electric field is applied more perpendicular to the direction of motion. Therefore, the most efficient way to use the SIEF is in a direction substantially perpendicular to the direction of motion. The encapsulated bichromal balls have a permanent electric dipole moment, while the empty shells do not. Thus, the encapsulated bichromal balls experience an additional force from the SIEF and their trajectory bends in the direction of the electric field gradient. The empty shells do not experience an additional force from the SIEF and, therefore, travel throughout the electric field gradient substantially parallel to the flow field (i.e., in the x direction). The change in trajectory of the encapsulated bichromal balls can then be used to separate or isolate the encapsulated bichromal balls from the empty shells.

The total deflection $\Delta y$ of the encapsulated bichromal balls from a straight trajectory depends upon their dipole moment p, the strength of the electric field gradient ($\partial_y E$), and the time interval $\Delta t$ the capsules travel through the electric field. For a constant electric field gradient, the deflection is estimated as $$\Delta y = \frac{d}{\alpha} \Delta t \qquad (1)$$

where $$d = \frac{p \partial_y E}{m} \qquad (2)$$

and $$\alpha = \frac{6\pi \eta r}{m} \qquad (3)$$

$\eta$ is the dynamic viscosity of the fluid, and r and m are the particle size and mass, respectively. Because of the similar density of the bichromal balls and the encapsulated liquid in the "empty shells," the mass difference of the filled and empty shells is assumed negligent.

After passage through the SIEF, the isolated, encapsulated bichromal balls may be separated from the fluid carrier. Techniques for separating the encapsulated balls from the fluid carrier are known in the art and include, for example, filtration. Suitable filters include, but are not limited to fibrous filters and metal screens. The filters may include a pore size of approximately 20 µm, however, any suitable pore size which allows passage of the fluid but not the encapsulated balls through the filter may be used.

Figure 2A:
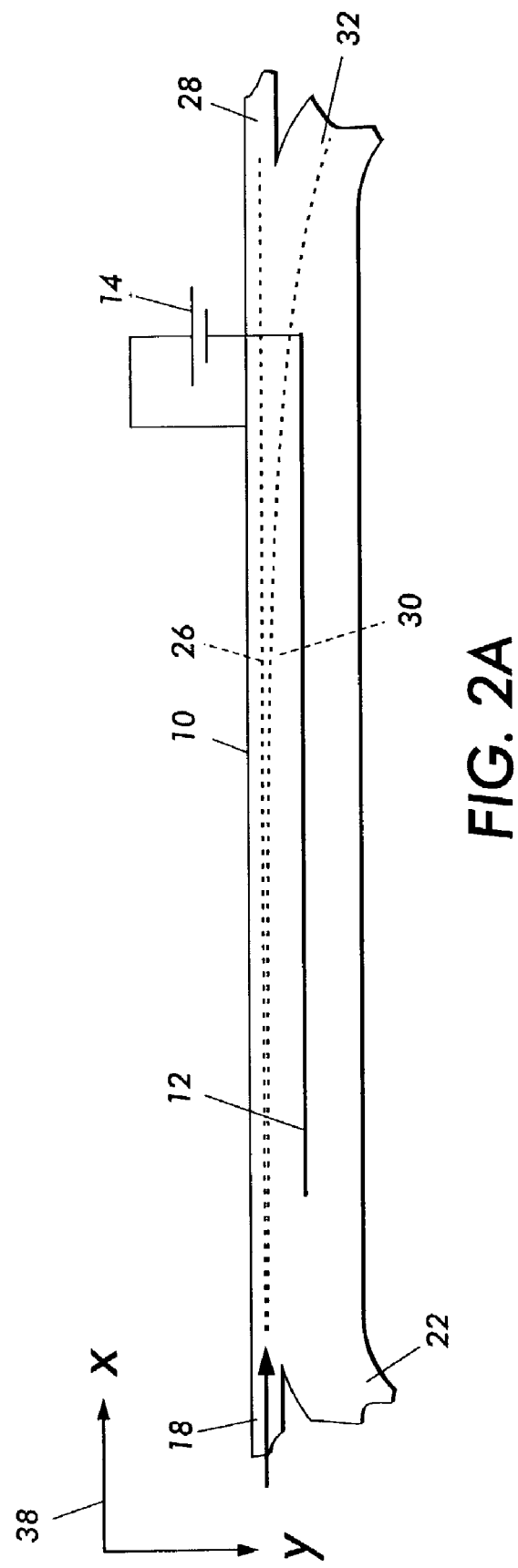
FIGS. 2A–B are schematic diagrams of a system for separation of encapsulated bichromal balls by fluid flow in accordance with one embodiment of the present invention.
Figure 2B:
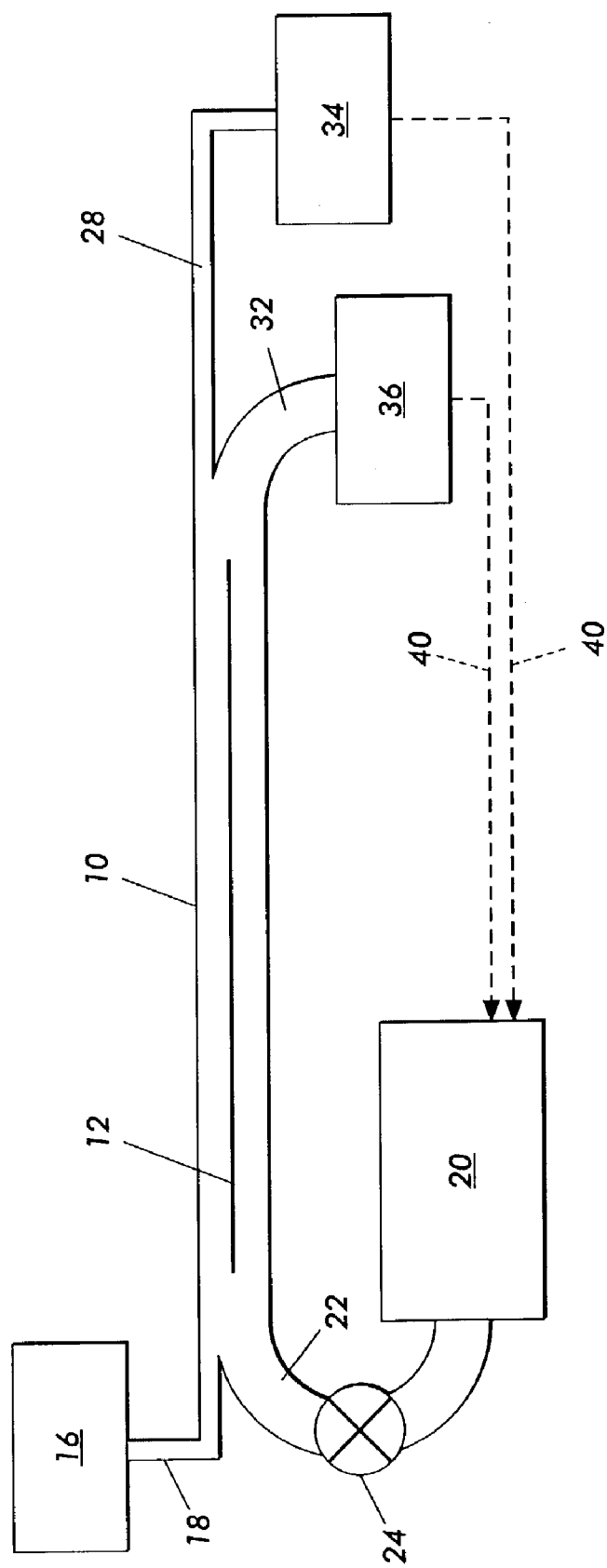

A system for separation by laminar fluid flow in accordance with one embodiment of the present invention is shown schematically in FIGS. 2A–B. In particular, the system includes a first electrode 10 (e.g., cathode) and a second electrode 12 (e.g., anode) connected to a power supply 14 to generate an electric field. Examples of electrode configurations are described later with reference to FIGS. 5A–B. A supply tank 16 of un-separated capsules is connected to a supply conduit of un-separated capsules 18. A supply tank of fluid carrier 20 is connected to a supply conduit for fluid carrier 22 through a valve 24. The supply conduits 18, 22 allow the mixture of un-separated capsules and fluid carrier to pass through the electric field generated between electrodes 10 and 12. The empty capsules follow trajectory 26 and pass into exit conduit 28, while the filled capsules follow trajectory 30 and pass into exit conduit 32. The empty capsules are collected in reservoir 34 and the filled capsules are collected in reservoir 36. The coordinate axis as shown in FIG. 1 are labeled as 38 in FIG. 2A for reference. After separation, the fluid carrier may be recycled back into the supply tank of fluid carrier, as shown by arrows 40 in FIG. 2B.

Figure 3:
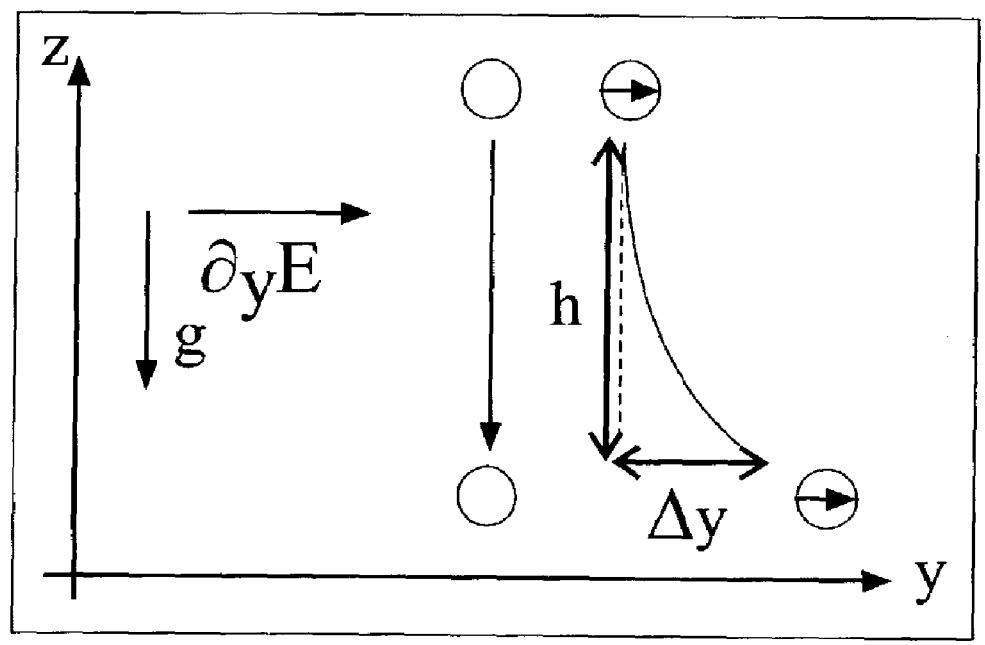
FIG. 3 is a schematic diagram of the flow directions and force directions for the separation of encapsulated bichromal balls by gravitational passage.

A second embodiment of a method and system of the present invention is shown in FIG. 3. In this particular embodiment, a mixture comprising a plurality of encapsulated bichromal balls and at least one shell which does not encapsulate a bichromal ball is separated using gravitational force through air or a vacuum. In particular, as shown in FIG. 3, the mixture is dropped in a container (e.g., a tube) and the capsules (i.e., encapsulated bichromal balls and empty shells) fall due to gravity. More specifically, the capsules fall in the −z direction due to the gravitational acceleration g. The SIEF gradient ($\partial_y E$) is directed substantially perpendicular to the direction of motion of the mixture (i.e., the direction of the fall) and parallel to the y direction. Again, as described above, the encapsulated bichromal balls will experience the additional force from the SIEF and their trajectory will bend in the direction of the electric field gradient. More specifically, after falling a distance h through the electric field, the encapsulated balls deflect by a distance Δy from the straight path of the empty shell(s).

When this separation is performed in air, the falling capsules will reach a terminal velocity (g/α) determined by the balance of the gravitational and drag forces on the capsules. When the encapsulated bichromal balls travel a distance h through a constant electric field gradient, their total deflection is estimated as $$\Delta y = \frac{dh}{g} \quad (4)$$

The particle deflection shown in the above equation has been calculated assuming the particles have reached terminal velocity before entering the electric field. When they continue to accelerate while moving through the electric field, the deflection is larger due to the longer time they are exposed to the electric field gradient. When the separation is performed in a vacuum, the particle deflection is exactly as given by the above equation (for a constant electric field gradient). Separation in a vacuum eliminates the possibility of turbulent flow interfering with the separation.

Figure 4:
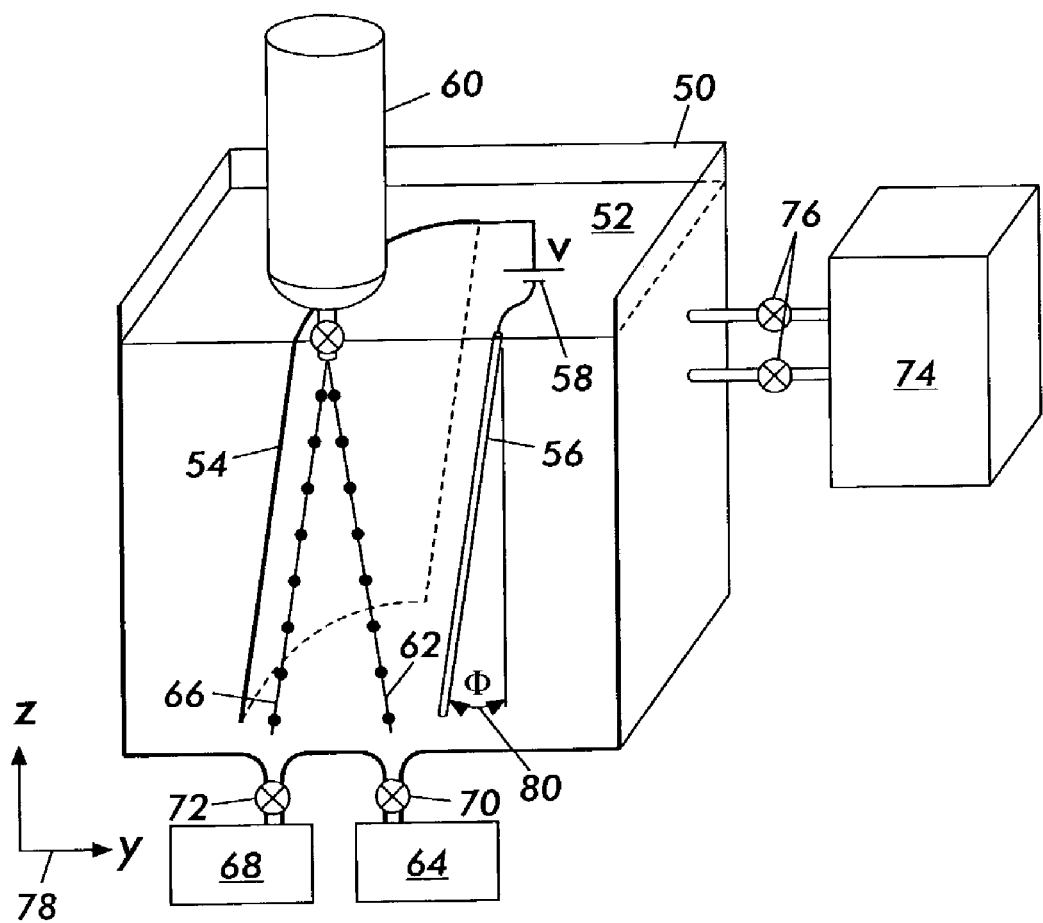
FIG. 4 is a schematic diagram of a system for separation of encapsulated bichromal balls by sedimentation in accordance with one embodiment of the present invention.

A third embodiment of a method and system of the present invention relates to separation through a liquid due to gravitational force (i.e., sedimentation). A schematic showing one embodiment of a system for implementation of this method is shown in FIG. 4. The system includes a separation tank 50 filled with liquid 52. A first electrode 54 (e.g., cathode) and a second electrode 56 (e.g., anode) are connected to a power supply 58 to generate an electric field. A supply tank of un-separated capsules 60 is connected to the separation tank 50. The un-separated capsules pass through the electric field generated by electrodes 54 and 56. The filled capsules follow trajectory 62 into reservoir 64, while the empty capsules follow trajectory 66 into reservoir 68. The reservoirs 64 and 68 include valves 70 and 72, respectively. In this particular embodiment, the system includes a reservoir 74 which holds additional liquid 52 and a control system 76 to maintain the liquid level in separation tank 10 at a constant level.

This embodiment of the present invention is similar to that described with reference to FIG. 3. The coordinate axis of FIG. 3 are also shown in FIG. 4 as 78 for reference. However, with regard to the embodiment described with reference to FIG. 3, the liquid 52 would be replaced with air or a vacuum. When a vacuum is utilized, the tank 50 is sealed and the liquid reservoir 74 and control system 76 is replaced with a vacuum pump.

In the embodiment shown in FIG. 4, the capsules include encapsulated bichromal balls and empty shells which are dropped in a liquid that has a density $\rho_l$ that is less than the density of the capsules $\rho_c$. (When the density of the liquid is larger than the density of the capsules, the capsules will rise with constant speed. This could also be used for separation). Due to the gravitational force, the particles will descend with a constant velocity given by the balance of gravitational and friction force $$v = \frac{2r^2 g(\rho_c - \rho_l)}{9\eta}, \quad (5)$$

where g=9.81 m/s² is the gravitational acceleration, η is the viscosity of the liquid, and r is the radius of one capsule.

In this particular embodiment, the SIEF is applied substantially perpendicular to the direction of sedimentation. The filled capsules will deflect due to their dipole moment. For a sedimentation distance h, the filled capsules will experience a lateral deflection of $$\Delta y = \frac{dh}{g} \frac{\rho_c}{(\rho_c - \rho_l)}, \quad (6)$$

where $$d = \frac{p \partial_y E}{m}, \quad (7)$$

p is the dipole moment, $\partial_y E$ is the gradient of the electric field perpendicular to the direction of sedimentation, and m is the mass of one capsule.

Though this method and system is similar to that described with reference to FIG. 3, sedimentation in a liquid has the advantage that the velocity with which the capsules move through the SIEF can be controlled by choosing a liquid with the appropriate density. In particular, the sedimentation speed depends on the difference in density between the capsules and the liquid. This allows the time that the capsules spend inside the SIEF to be maximized, hence allowing for sufficient separation before extracting the capsules from the liquid. More specifically, the liquid can be chosen to allow the capsules to move very slowly through the electrical field, thus substantial separation can be achieved with shorter (potentially less expensive) electrodes. Thus, suitable liquids in accordance with this embodiment of the present invention are determined by the capsules being separated. Examples of suitable liquids include, but are not limited to, water, Isopar oil, silicon oil, isopropyl alcohol, hexanes, toluene, and mixtures thereof.

For a situation where the capsules (both filled and empty) have an additional monopole moment, all particles will experience a deflection inside the electric field. A possible method to compensate for this is aligning the electrodes that provide the electric field gradient at an angle φ to the direction of the driving force (i.e., the direction of the fluid flow or gravitational force) (see 80 in FIG. 4). For the sedimentation case, the angle is defined by $$\cos 2\phi = -\frac{\alpha^2}{4} \pm \frac{\alpha}{2} \sqrt{\frac{\alpha^2}{2} + 2}, \quad (8)$$

with α=4πr³ ($\rho_c$-$\rho_l$)g/3QE, and Q is the monopole charge on the capsules. In this case, the balance of the gravitational and electrical forces make the capsules move on a straight line that is substantially perpendicular to the SIEF field. However, the additional dipolar moment of the filled capsules will lead to a deviation from this straight line that will allow separation of those capsules from the unfilled capsules. Another method to compensate for the monopole moments on the capsules is to apply an alternating current (ac) voltage to the electrodes. The monopole charge of the capsules will make the particles change direction with the electric field, hence leading to time average zero displacement. However, particles with a dipole moment will always experience an additional force into the direction of increasing field gradient, hence allowing separation as described above. This is also true if each capsule has a different monopole charge. The only requirement for the ac voltage is that its frequency be low enough so that the dipoles inside the capsule have time to realign themselves with the new field direction. Possible sources of monopole charge on the capsules include tribo-charging of dry shells, or dissociation of surface molecule in a liquid environment. In the second case, charge control agents can be added to the solution to adjust/ minimize any monopole charge.

Isolating at least one encapsulated particle after any of the above separations is achieved by any suitable method, such as collecting the empty and filled capsules in separate reservoirs positioned at the end of the electric field. Once isolated, the encapsulated particles may be used as desired, e.g., incorporated in display media.

Although the invention has been described with reference to bichromal balls, the methods and systems of the present invention may be used with any particles having an electric charge. In particular, the particles for use in the methods and systems of the present invention may be monopolar, dipolar, or both. Capsules that have a monopolar charge that is different between filled and empty capsules may be separated by both spatially homogeneous and spatially inhomogeneous fields (and constant and non-constant electric fields). Neutral shells that are filled with a particle with a permanent dipole moment may be separated from empty capsules by a spatially inhomogeneous field, as described above. Techniques and apparatuses for generating suitable electric fields for separation of monopolar particles are known in the art and will not be described in detail herein (see, e.g., Jackson, *Classical Electrodynamics*, John Wiley & Sons (1998), which is hereby incorporated by reference in its entirety).

Moreover, dipolar particles in accordance with the present invention may have a permanent dipole moment (e.g., bichromal balls) or an induced dipole moment. For particles having an induced dipole moment, the dipole moment is dependent upon the electric field used. In particular, any dielectric particle will develop an induced dipole moment when exposed to an electric field E that is proportional to the field: $p_{ind}=\gamma E$. $\gamma$ is the polarizability and describes how easily a material is polarized in an applied field. Systems with mobile charges, e.g., encapsulated electrophoretic inks that contain nano- or micron-sized particles of opposite charge, provide a large induced dipole moment at low applied fields. Neutral capsules that have a difference in polarizability between filled and empty capsules may be separated by a spatially inhomogeneous field, since the induced dipole moment due to the applied field will be different in this case. This method works for both electric and magnetic dipole moments (permanent or induced) in an electric or magnetic field, respectively.

Dipolar particles in accordance with the present invention may have an electric dipole moment (e.g., bichromal balls) or a magnetic dipole moment. Examples of suitable dipolar particles having a magnetic dipole moment include, but are not limited to, magnetite nano- or micro-particles, nano- or micron-sized particles of cobalt in an organic carrier, and the like (see, e.g., Rosenweig, *Ferrohydrodynamics*, Dover Publications, Inc. (1997), which is hereby incorporated by reference in its entirety). In the case of particles having a magnetic dipole moment, a spatially inhomogeneous magnetic field would be used for separation. Techniques and apparatuses for producing such magnetic fields are known in the art and will not be described detail herein (see, e.g., Jackson, *Classical Electrodynamics*, John Wiley & Sons (1998), which is hereby incorporated by reference in its entirety).

In addition, any suitable shell may be used in the methods of the present invention. For example, polymer shells (e.g., transparent polymer shells and opaque polymer shells), shellac, epoxy, and glass may be used as shells in the present invention. Examples of suitable polymers for the polymer shells include, but are not limited to, polyurethanes, polystyrenes, polymethylmethacrylate, gelatin-gum Arabic, gelatin-polyphosphate, and polyureas. Other examples of shell materials are described in U.S. Pat. No. 6,067,185, which is hereby incorporated by reference in its entirety.

With regard to the embodiment of the present invention relating to separation of bichromal balls, the mixture of at least one encapsulated bichromal ball and at least one empty shell may be provided by methods known in the art. For example, methods for producing bichromal balls are described in commonly assigned U.S. Pat. Nos. 4,126,854, 4,143,103, 5,075,186, 5,262,098, 5,344,594, 5,389,945, 5,604,027, and 5,708,525, which are hereby incorporated by reference in their entirety.

Further, although the above-described methods and systems of the present invention relate to the passage of encapsulated particles and empty shells through electric or magnetic fields (e.g., by laminar fluid flow or by gravitational passage), separation can be achieved without passage of the particles through the field. In particular, by simply positioning the mixture of filled and empty capsules in an electric or magnetic field, the capsules will separate and can then be isolated. However, passage through an electric or magnetic field allows for a continuous method of separation.

In the methods and systems described above, at least 20% of the unfilled shells may be separated from a mixture of filled and unfilled shells. In particular, in one embodiment, from about 20% to about 80% of unfilled shells may be separated.

Figure 5:
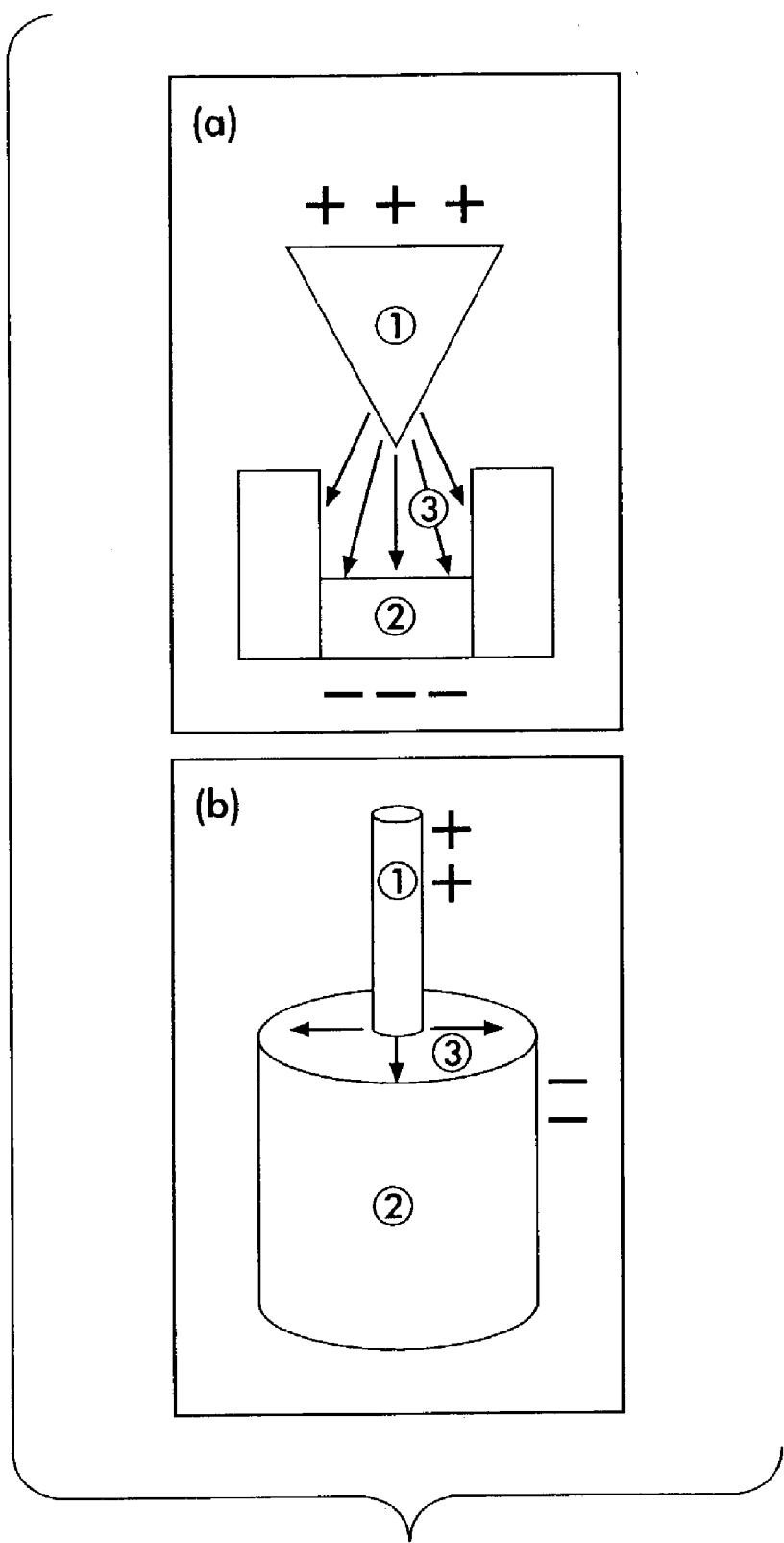
FIGS. 5A–B are schematic diagrams of electrode configurations for generating a spatially inhomogeneous electric field.

Suitable techniques and apparatuses for generating a SIEF in the methods and systems of the present invention are shown in FIGS. 5A–B. The apparatuses shown in FIGS. 5A–B may also include a suitable housing (e.g., a tube), as is known in the art. In particular, FIG. 5A shows an electrode configuration matching the Stern Gerlach experiment (separating free electrons by their magnetic dipole moment) which produces a strong, approximately constant, magnetic field gradient with the magnet geometry shown. The forces of an electric field on an electric dipole and of a magnetic field on a magnetic dipole are of the same form, namely $p\partial_y E$ and $m\partial_y B$, respectively, where m is the magnetic dipole moment and $\partial_y B$ is the magnetic field gradient, and the requirements on magnet geometry are the same for the electrode configuration to achieve a constant field gradient. As shown in FIG. 5A, the electrode configuration includes anode (1), cathode (2), and electric field lines (3).

An alternative electrode configuration is shown in FIG. 5B. In this figure, two concentric cylinders are shown. The outer cylinder (2) is hollow and the inner cylinder (1) can be a wire. In inner cylinder (1) is the anode, the outer cylinder (2) is the cathode, and the electric field lines are shown as (3). The capsules move parallel to the axis between the two cylinders. However, this electrode configuration will produce an electric field gradient that decreases with the inverse distance squared (i.e., a non-constant field gradient). The SIEF is calculated as follows:

$$\partial_y E \equiv \frac{\partial E}{\partial r} = \frac{V_a - V_i}{\ln(r_a/r_i)} \frac{1}{r^2} \quad (9)$$

Assuming over-damped dynamics (i.e., where the time scale or velocity changes of the particles due to the electric field gradient is much larger than the drag time scale $1/\alpha$) the deflections are estimated as $$\Delta y = \sqrt[3]{\frac{DL}{\alpha u_f}} \quad (10)$$

and $$\Delta y = \sqrt[3]{\frac{Dh}{g}} \quad (11)$$

for separation in laminar fluid flow and separation in free fall through air or vacuum, respectively, and with $$D = \frac{p}{m} \frac{V_a - V_i}{\ln(r_a/r_i)}. \quad (12)$$

Here, the total displacement is increasing much less with L or h, p, and ($\partial_y E$), as compared to the case with the constant electric field gradient. On the other hand, equations (10) and (11) are results for the over-damped case and present a lower limit of the total deflection of the encapsulated particles. When the radius of the inner cylinder in the electrode configuration of FIG. 5B is very small, the electric field gradient will become very strong and the capsule dynamics will not be over-damped, leading to larger total deflection.

EXAMPLES

Example 1

Typical parameters for the method of separation as shown in FIG. 5B for bichromal balls are set forth in Table 1, below.

TABLE 1

| Parameter | Size |
| --- | --- |
| Radius of Ball | 30 µm |
| Dipole Moment | $1.5 * 10^{-17}$ Cm (50 fC separated by 30 µm, permanent or induced) |
| Radius of Shell | 50 µm |
| Density | $10^3$ kg/m$^3$ |
| $V_a - V_i$ | 1000 V |
| Inner Electrode Radius | 0.5 mm |
| Outer Electrode Radius | 10 mm |

Using these parameters and the deflection formulas derived above, Tables 2 and 3 set forth the (minimal) deflections for the encapsulated balls.

TABLE 2

Separation In A Fluid With Viscosity of $10^{-3}$ Pas

| Travel Time Through SIEF (s) | Deflection (mm) |
| --- | --- |
| 1 | 0.8 |
| 10 | 1.7 |
| 100 | 3.8 |
| 1000 | 8 |

TABLE 3

Separation In Free Fall Through Air Or Vacuum

| Travel Distance Through SIEF (m) | Deflection (mm) |
| --- | --- |
| 0.25 | 2.9 |
| 0.5 | 3.7 |
| 1.0 | 4.6 |

TABLE 4

Separation Through Sedimentation In Liquid With $\rho_1 = 0.99 \, \rho_c$

| Travel Distance Through SIEF (m) | Deflection (mm) |
| --- | --- |
| 0.01 | 4.6 |
| 0.05 | 7.9 |
| 0.1 | 9.9 |

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefor, is not intended to limit the claimed process to any order except as may be specified in the claims.

What is claimed is:

1. A method of separating encapsulated dipolar particles from empty shells comprising:
    providing a mixture comprising at least one dipolar particle encapsulated in a shell and at least one shell which does not encapsulate a dipolar particle;
    positioning the mixture in a spatially inhomogeneous electric or magnetic field; and
    isolating at least one encapsulated dipolar particle from the mixture.

2. The method according to claim 1 wherein at least one dipolar particle is a bichromal ball.

3. The method according to claim 1 wherein the shell is a polymer shell.

4. The method according to claim 1 wherein the mixture comprises a plurality of encapsulated dipolar particles.

5. The method according to claim 1 wherein the mixture comprises a plurality of shells which do not encapsulate a dipolar particle.

6. The method according to claim 1 wherein at least one encapsulated dipolar particle and at least one shell which does not encapsulate a dipolar particle have a monopolar electric charge and the spatially inhomogeneous electric field is an alternating current electric field.

7. The method according to claim 1 wherein positioning comprises passing the mixture through a spatially inhomogeneous electric or magnetic field directed in a non-parallel direction to a direction of motion of the mixture.

8. The method according to claim 7 wherein passing comprises passing through the spatially inhomogeneous electric or magnetic field in a fluid carrier.

9. The method according to claim 7 wherein passing comprises gravitational passage through the spatially inhomogeneous electric or magnetic field.

10. The method according to claim 1 wherein isolating comprises collecting at least one encapsulated dipolar particle and at least one shell which does not encapsulate a dipolar particle in separate reservoirs positioned at an end of the spatially inhomogeneous electric or magnetic field.

11. A system for separating encapsulated dipolar particles from empty shells comprising:
  a mixture comprising at least one dipolar particle encapsulated in a shell and at least one shell which does not encapsulate a dipolar particle, and
  an apparatus which provides a spatially inhomogeneous electric or magnetic field, wherein the spatially inhomogeneous electric or magnetic field is directed in a non-parallel direction to a direction of motion of the mixture to isolate at least one encapsulated dipolar particle.

12. The system according to claim 11 wherein at least one dipolar particle is a bichromal ball.

13. The system according to claim 11 wherein the mixture comprises a fluid carrier.

14. A method of separating encapsulated particles from empty shells comprising:
  providing a mixture comprising at least one particle having an electric charge encapsulated in an electrically neutral shell and at least one electrically neutral shell which does not encapsulate a particle;
  positioning the mixture in an electric field; and
  isolating at least one encapsulated particle from the mixture.

15. The method according to claim 14 wherein the shell is a polymer shell.

16. The method according to claim 14 wherein the mixture comprises a plurality of particles having an electric charge each encapsulated in an electrically neutral shell.

17. The method according to claim 14 wherein the mixture comprises a plurality of electrically neutral shells which do not encapsulate a particle.

18. The method according to claim 14 wherein at least one encapsulated particle has an induced dipole moment different from at least one electrically neutral shell which does not encapsulate a particle in the electric field.

19. The method according to claim 14 wherein positioning comprises passing the mixture through an electric field directed in a non-parallel direction to a direction of motion of the mixture.

20. The method according to claim 19 wherein passing comprises passing through the electric field in a fluid carrier.

21. The method according to claim 19 wherein passing comprises gravitational passage through the electric field.

22. The method according to claim 14 wherein isolating comprises collecting at least one encapsulated particle and at least one electrically neutral shell which does not encapsulate a particle in separate reservoirs positioned at an end of the electric field.

23. A system for separating encapsulated particles from empty shells comprising:
  a mixture comprising at least one particle having an electric charge encapsulated in an electrically neutral shell and at least one electrically neutral shell which does not encapsulate a particle, and
  an apparatus which provides an electric field, wherein the electric field is directed in a non-parallel direction to a direction of motion of the mixture to isolate at least one encapsulated particle.

24. The system according to claim 23 wherein the mixture comprises a fluid carrier.

* * * * *